(12) United States Patent
St. Amant et al.

(10) Patent No.: US 8,337,763 B1
(45) Date of Patent: Dec. 25, 2012

(54) SYSTEM FOR REMOVING UNWANTED CONTAMINATES FROM FLUIDS

(75) Inventors: Jefferey St. Amant, League City, TX (US); Kenneth R. Matheson, Corpus Christi, TX (US); Keith Nathan, Seabrook, TX (US)

(73) Assignee: Vapor Point, LLC, La Porte, TX (US)

( * ) Notice: Subject to any disclaimer, the term of this patent is extended or adjusted under 35 U.S.C. 154(b) by 0 days.

(21) Appl. No.: 13/403,918

(22) Filed: Feb. 23, 2012

Related U.S. Application Data (63) Continuation of application No. 12/492,072, filed on Jun. 25, 2009, now abandoned, which is a continuation-in-part of application No. 12/365,567, filed on Feb. 4, 2009, now abandoned.

(60) Provisional application No. 61/063,901, filed on Feb. 6, 2008, provisional application No. 61/065,720, filed on Feb. 14, 2008.

(51) Int. Cl.
*B01D 50/00* (2006.01)
*B01D 47/02* (2006.01)

(52) U.S. Cl. ........ 422/180; 422/171; 422/177; 422/176; 422/220; 422/611; 422/900; 95/210; 95/211; 95/92; 96/4; 96/329

(58) Field of Classification Search .................. 422/171, 422/177, 176, 180, 220, 611, 900; 95/210, 95/211, 92; 96/4, 329
See application file for complete search history.

(56) References Cited

U.S. PATENT DOCUMENTS

| | | | |
|---|---|---|---|
| 3,596,440 A | 8/1971 | Nutter et al. | |
| 3,749,377 A | 7/1973 | Slater et al. | |
| 4,657,566 A | 4/1987 | Wintering et al. | |
| 5,004,486 A | 4/1991 | Chen | |
| 5,050,603 A | 9/1991 | Stokes et al. | |
| 5,064,450 A | 11/1991 | Lankton et al. | |
| 5,122,165 A | 6/1992 | Wang et al. | |
| 5,217,616 A | 6/1993 | Sanyal et al. | |
| 5,494,614 A | 2/1996 | Gohara et al. | |
| 5,529,612 A | 6/1996 | Troost | |
| 5,635,394 A | 6/1997 | Horn | |
| 5,753,189 A | 5/1998 | Rehmat | |
| 6,447,585 B1 | 9/2002 | Buchholz, Jr. et al. | |
| 6,759,018 B1 | 7/2004 | Arno et al. | |
| 7,147,689 B1 | 12/2006 | Miller | |
| 2001/0045162 A1 | 11/2001 | McQuigg et al. | |
| 2006/0213370 A1 | 9/2006 | Leonard et al. | |
| 2007/0157807 A1 | 7/2007 | Castagnos, Jr. et al. | |
| 2007/0251393 A1 | 11/2007 | Pope et al. | |
| 2008/0014350 A1 | 1/2008 | Carlson et al. | |
| 2011/0067994 A1 | 3/2011 | Moorhead et al. | |

*Primary Examiner* — Walter D Griffin
*Assistant Examiner* — Lessanework Seifu
(74) *Attorney, Agent, or Firm* — Buskop Law Group, PC; Wendy Buskop (57) ABSTRACT

A system for removing unwanted contaminates from fluid using a scrubber, which comprises a housing, a reaction chamber having a liquid level, and an inlet connected to a source containing fluid to be scrubbed with a contamination concentration greater than zero ppb to saturation. An exit port connected to the housing used for evacuating scrubbed fluid and a sintered permeable membrane disposed across the reaction chamber, which provides a reaction zone in the plurality of pores when fluid to be scrubbed is introduced to the membrane on a first side while the membrane is immersed in the biodiesel or biomass and a cleaned fluid on a second side wherein the clean fluid initially has a drop in contamination concentration of at least 99 percent and gradually decreasing to 70 percent as additional fluid to be scrubbed is introduced to the plurality of pores without replacing the biodiesel or biomass.

11 Claims, 8 Drawing Sheets

SYSTEM FOR REMOVING UNWANTED CONTAMINATES FROM FLUIDS

CROSS REFERENCE TO RELATED APPLICATIONS

The present application is a continuation application, which claims priority to U.S. patent application Ser. No. 12/492,072 filed on Jun. 25, 2009, entitled "SYSTEM FOR REMOVING UNWANTED CONTAMINATES FROM FLUIDS", which is a continuation in part application and claims priority to U.S. patent application Ser. No. 12/365,567 filed on Feb. 4, 2009, entitled "SYSTEM FOR REMOVING UNWANTED CONTAMINATES FROM GASES", which further claims priority to U.S. Provisional Application Ser. No. 61/063,901 filed on Feb. 6, 2008, entitled "GAS/LIQUID CONTACT DEVICE" and U.S. Provisional Application Ser. No. 61/065,720 filed on Feb. 14, 2008, entitled "GAS/LIQUID CONTACT DEVICE". These references are incorporated herein.

FIELD

The present embodiments generally relate to a system for the removal and recovery of unwanted contaminates, such as volatile organic compounds (VOCs), from fluids.

BACKGROUND

A need exists for a fluid scrubber with up to about 100 percent efficiency and no less than about 70 percent efficiency.

A further need exists for a fluid scrubber that does not require utilities and does not generate heat.

A further need exists for a fluid scrubber that is low pressure to operate; which is safer than other scrubbers that operate at high pressures.

A need exists for a fluid scrubber that can be connected in series or in parallel; which can further be a truck or a barge loaded, or welded to a facility for flexibility of use.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for removing unwanted contaminates, such as volatile organic compounds (VOCs), from fluids.

Volatile organic compounds (VOCs) are organic chemical compounds that have high enough vapor pressures under normal conditions to significantly vaporize and enter the atmosphere. VOCs can include a wide range carbon based molecules, including aldehydes, ketones, benzenes, toulenes, zylenes, and other light hydrocarbons.

The present embodiments can further relate to a system for removing and recovering unwanted contaminates from fluid using a scrubber, which comprises a housing, a reaction chamber having a liquid level, an inlet connected to a source containing fluid to be scrubbed with a contamination concentration greater than zero ppb to saturation. An exit port can be connected to the housing and can be used for evacuating scrubbed fluid and a sintered permeable membrane can be disposed across the reaction chamber, which provides a reaction zone in the plurality of pores when fluid to be scrubbed is introduced to the membrane on a first side while the membrane is immersed in the biodiesel or biomass; and a cleaned fluid on a second side wherein the clean fluid initially has a drop in contamination concentration of at least 99 percent and gradually decreasing to 70 percent as additional fluid to be scrubbed is introduced to the plurality of pores without replacing the biodiesel or biomass.

Biodiesel refers to a non-petroleum based hydrocarbon consisting of short chain alkyl (methyl, ethyl, etc) esters manufactured by the transesterification (Alcoholysis) of plant and animal fats. Fatty acids are aliphatic carboxylic acids with varying hydrocarbon lengths at one end of the free chain joined to a terminal carboxyl (—COOH) group at the other end. Fatty acids are predominately unbranched, but can be branched, and those with chain lengths that are even and between 12 carbons and 22 carbons react with glycerol to form lipids. The biodiesel can have a flashpoint between about 130 degrees Centigrade to about 390 degrees Centigrade. The biodiesel can have a specific gravity of between about 0.87 to about 1.4 specific gravity. Biodiesel is hydrophobic (non-miscible with water molecules).

Biodiesel is also known to be hygroscopic (attracting water molecules from the atmosphere), increasing both its solvent capacity and its solubility speciation. This amphiphilic biodiesel blend; having a polar water soluble group attached to a non-polar, water insoluble hydrocarbon chain; captures or recovers volatile organics, BTEX and heavier hydrocarbons that would otherwise be lost to the atmosphere/environment, destroyed (creating $CO_2$ and NOx), or land filled.

The ethyl, butyl, and larger alkyl esters have non-polar chains in the head groups that are sufficient in size to shield the forces between the more polar positions of the head group, presenting somewhat different solvency/solubility. It has been demonstrated that blends of chain lengths and saturation such as vapor sorb, can create broad spectrum selectivity/solvency to cover the broad speciation of VOC's/BTEX common in industrial plant manufacture activities.

Fatty acids that are saturated have no double bonds; while unsaturated (or polyunsaturated) have one or more double bonds. Stearic acid (octadecanoic acid) is the most common long chain fatty acid derived from both animal and vegetable fats, commonly used as a lubricant and as an additive in industrial preparation. Some fatty acids usable herein include: Lauric, Myrlstic, Palmitic, Stearic, Oleic, Ricinoleic, Vaccenic, Linoleic, Alpha-Linolenic, Gamma-Linolenic, Arachidic, Gadoleic, Arachidonic, Behenic, Erucic, and Lignoceric.

Biomass, sometimes referred to as biofuel, can be defined as solid, liquid, or gaseous materials derived from recently dead biological materials; while fossil fuels are derived from long dead biological material. Non-petroleum hydrocarbons can be produced from any biological carbon source; although the most common sources are from photosynthesis plants and animal fats. Biomass is materially derived from recently living organisms including plants, animals, and their byproducts; a renewable energy/recovery source based upon the carbon cycle, unlike fossil and nuclear sources. Animal waste is an unavoidable pollutant. Agricultural products are specifically grown that produce/contain high amounts of vegetable oils and sugars that can be readily converted to non-petroleum based hydrocarbons. Non-petroleum based hydrocarbons do not have a net increase in $CO_2$ when used as an energy/recovery source because as the plants are initially grown they consume or remove $CO_2$ from the atmosphere.

The housing of system for removing unwanted contaminates from fluids can have up to a 48 inch diameter and a height up to 72 inches, seam to seam.

The housing can be made from carbon steel, stainless steel or steel alloys, aluminum, bronze, brass copper, polyethylene, polypropylene, tungsten, PVC, reinforced fiberglass, concrete, or combinations of these materials. The housing can have one or more reinforcing ribs on either the inside or outside of the scrubber. The housing can resist explosion at internal pressures up to about 2500 psi.

The housing can be mounted on a pedestal horizontally or vertically. The housing can be a ball or a rounded rectangular housing, such as a rectangular box with rounded corners.

The pedestal can support the housing, which as described herein can be referred to as "scrubber". The pedestal can have an access port that connects to a drain port in the housing. The pedestal can be a ferrous or non-ferrous material but must be strong enough to support the weight of the housing with other components installed therein. The pedestal can be modular with the housing (removably detachable from the housing), so that both units can be easily truck mounted without the need for special permits when moved on a highway.

In an embodiment, the pedestal can be a mobile trailer, that is, a moveable pedestal as a trailer, but can also be fixed into the trailer construction.

The embodied system can be usable with a modular transportable system for removing unwanted contaminates from fluids, comprising: a movable transport vehicle and a removably modular scrubber disposed on the moveable transport vehicle.

Examples of movable transport vehicles can be: a barge, a trailer, a barge with a trailer disposed on the barge, a truck, a ship, a rail car with a trailer disposed thereon.

The embodied system can also be usable with a vacuum truck, wherein the system can further comprise a vacuum truck with a bed with at least one vacuum pump having a vacuum pump exhaust and at least one scrubber integrally and non-removably connected to the bed of the vacuum truck, wherein at least one scrubber engages the vacuum pump exhaust, and subsequent scrubbers can be connected in series to at least one scrubber.

Certain embodiments provide the benefit of utilizing biodiesel or bio fuel for treating a fluid. One such benefit is the ability to reuse or recycle the biodiesel or biofuel, providing no waste bi-products as the recycled material can be reprocessed through distillation to produce refined products such as liquefied benzene. Another benefit is the increased efficiency in the removal of VOCs, as other medium only have a demonstrated ability to absorb up to about 30 percent by weight, whereas biodiesel or biomass is capable of absorbing between about 50 percent to about 100 percent by weight. Another benefit in the use of biodiesel or biomass is the biodegradable, environmentally safe nature of the product.

As a benefit, the system does not require hooking up to any plant, municipal, or state utility to operate. The system can be truck mounted; and, using pressure and minimal energy, produces "cleaned" or "scrubbed fluid" that meets federal codes for clean air. No outside service needs to be planned for, and the scrubber can be used in remote or isolated locations where utilities are not available; such as in the Arctic Circle.

Another benefit of the embodiments is that because the invention does not have utilities, the scrubber is unlikely to have sparks or catch fire.

The embodiments provide tremendous versatility as they are modular and can be hooked up in series or in parallel with varying capacities and the ability to remove different contaminates.

The scrubber has no moving parts, so it is hard to break, creating no down time for a user due to maintenance issues.

The scrubber has lower costs for use, because: no down time, no repairs (or few needed), and reduction of regulatory fines and administrative costs resulting from an emission event due to equipment failures.

The scrubber has an efficiency in removal of contaminates of up to about 100 percent and at least about 70 percent.

A volatile compound as described herein can include: benzene, toluene, ethylene, xylenes, hexane, ethanols, MTBE, chlorinated hydrocarbons, aromatic compounds, acid gases and combinations thereof.

The housing can be double walled or single walled. The housing can be insulated. The housing can be adapted to provide heat tracing results during use.

The housing can include an interior liner, which can surround the reaction zone in the housing. The liner can be: film, a thermoplastic or composite coating, a phenolic resin coating, an epoxy paint, a rubber or combinations thereof.

Biodiesel or biomass can be filled through a liquid fill port in the housing. One biodiesel or biomass, or blends of two or more biodiesels or biomasses, can be used for treating the fluids added to the reaction zone.

Figure 1:
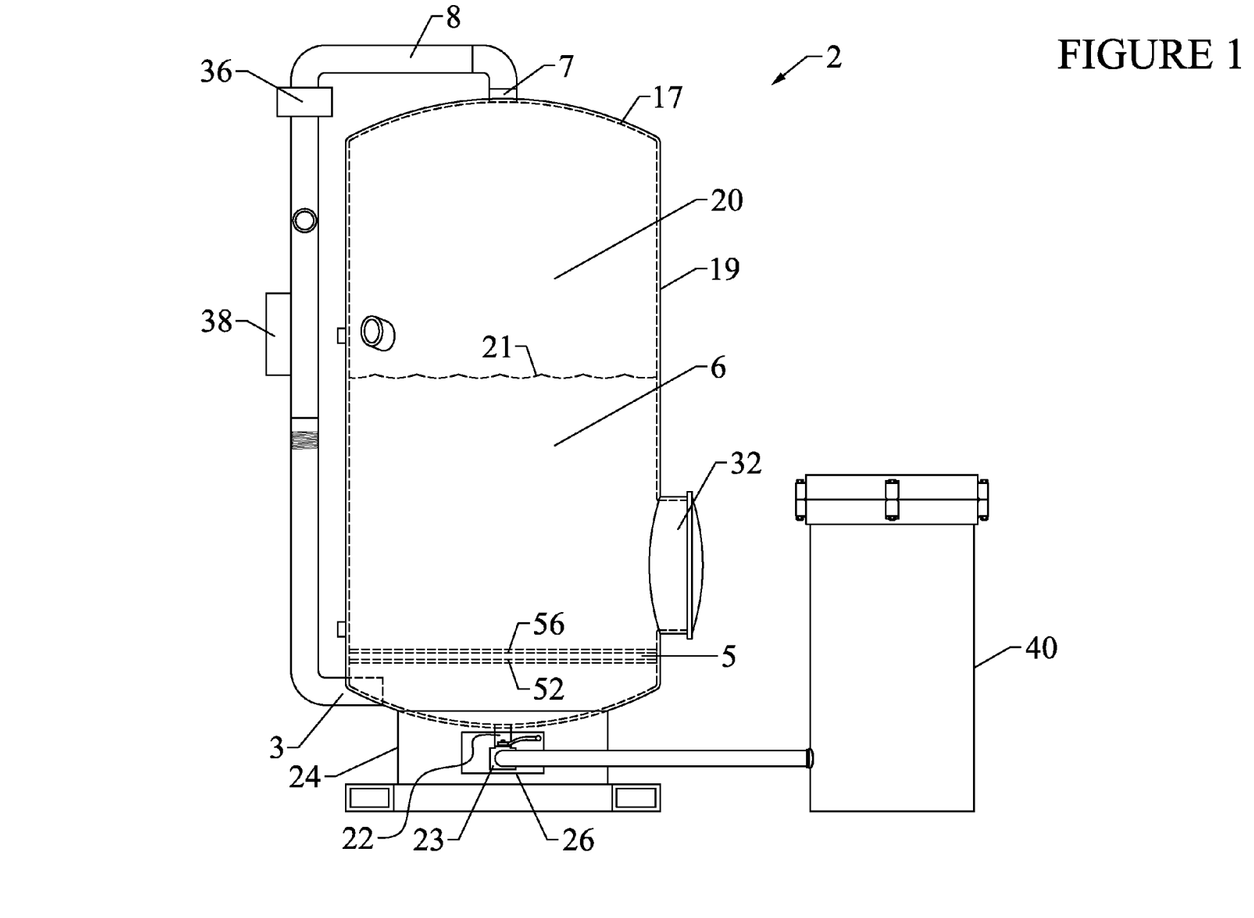
FIG. 1 is a schematic drawing of the overall system.

Turning now to the Figures, FIG. 1 shows a scrubber 2 with a housing 19 on a pedestal 24. Inside the housing 19 can be a reaction chamber 20 with a drain port 22. The drain port can flow to a collection tank 40.

The drain port 22 can be a sump and a drain tube, or a siphon tube can extend into the drain port to remove any liquid in the reaction zone using a pump. The sump and drain tube embodiment can be particularly useful with roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

In an embodiment, the pedestal 24, for supporting the scrubber 2, can have a pedestal access port 26, which can be a square cut entry or rectangular cut entry between about 6 inches by about 8 inches to about 12 inches by about 24 inches for allowing individuals or operator's access to the drain valve 23.

Also shown in FIG. 1 is a manway 32 in the housing for providing access to the inside of the housing to clean and maintain the reaction chamber or to replace the sintered permeable membrane. The manway in an embodiment can be a locking entry with a diameter of about 20 inches.

Figure 6:
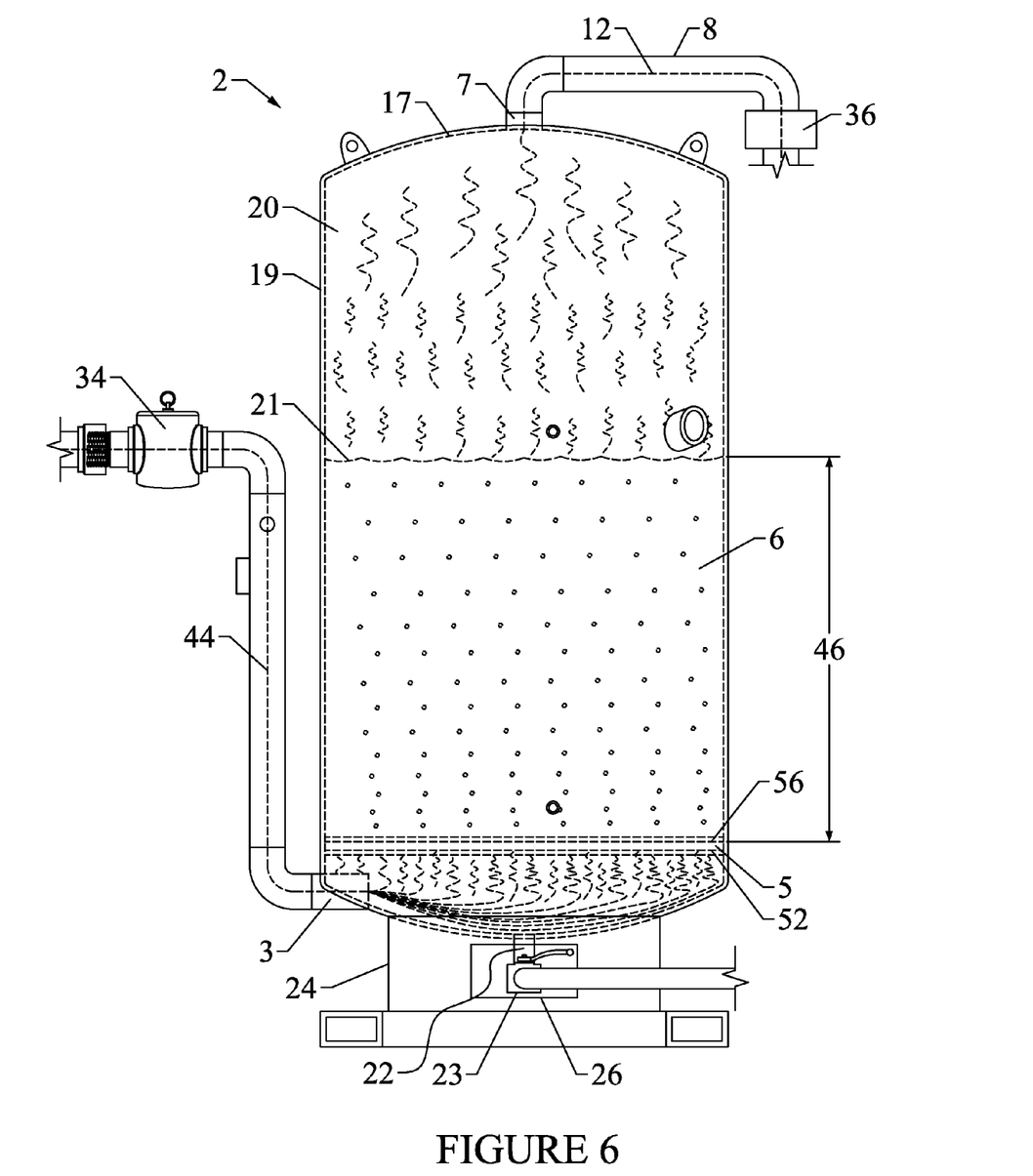
FIG. 6 shows the system after fluid to be scrubbed has been introduced to the system.

The reaction chamber 20 can also have an exit port 7. The exit port can be between about 3 inches to about 24 inches in diameter and can be used to evacuate scrubbed fluid that has been processed with this scrubber. The evacuation of the scrubbed fluid is shown in FIG. 6.

In an embodiment, the exit port can be contemplated to have the identical diameter to the inlet.

In still another embodiment, the exit port can have a diameter at least equal to the inlet.

An exit conduit 8 can be connected to the exit port 7 for allowing the scrubbed fluid to vent to the atmosphere or to another container.

A knock out canister 36, such as those custom made by Proco of Kingsville, Tex., can serve to knock out, remove, or capture any of the liquid that can be entrained in the scrubbed fluid. The knock out canister 36 can be located between a vent 38 and the exit conduit 8.

The reaction chamber 20 can be filled with a biodiesel or biomass 6 creating a liquid level 21. During scrubbing, the biodiesel or biomass 6 can move up and down in the reaction chamber 20 providing variable liquid levels 21 with the biodiesel or biomass 6 herein.

Biodiesel or biomass, as described above, is a non-petroleum based organic product having a viscosity related to the feedstock of the product, and wherein the product is made of fatty acid methyl esters from cooking oil; animal fats; plants such as algae, or vegetable oils by trans-esterification of those fats; plants and/or oils with alcohol. The biodiesel can have a flashpoint between about 130 degrees Centigrade to about 390 degrees Centigrade. The biodiesel can have a specific gravity of between about 0.87 to about 1.4 specific gravity.

The housing 19 can include an interior liner 17. The interior liner can line the inside of the entire housing. The interior liner can be film, a thermoplastic or composite coating, a phenolic resin coating, an epoxy paint, a rubber, or combinations thereof.

The housing 19 can also have an inlet 3. The inlet 3 can be connected to a source 1, shown in FIG. 2 that contains the fluid to be scrubbed 44, also shown in FIG. 2.

The inlet 3 can be below the liquid level 21 in the reaction chamber 20.

The inlet 3 can be about a 3 inch to about 24 inch diameter inlet with flow rates that can range from about 1 cubic feet per minute to about 20,000 cubic feet per minute.

In an embodiment it can be contemplated that the inlet 3 can be positioned in the housing 19 to insure that the fluid to be scrubbed is introduced to the biodiesel or biomass 6 initially.

FIG. 1 also shows a sintered permeable membrane 5, with a first side 52 and a second side 56, which can be disposed across the reaction chamber 20, extending from wall to wall of the housing 19, with or without the interior liner 17.

Figure 2:
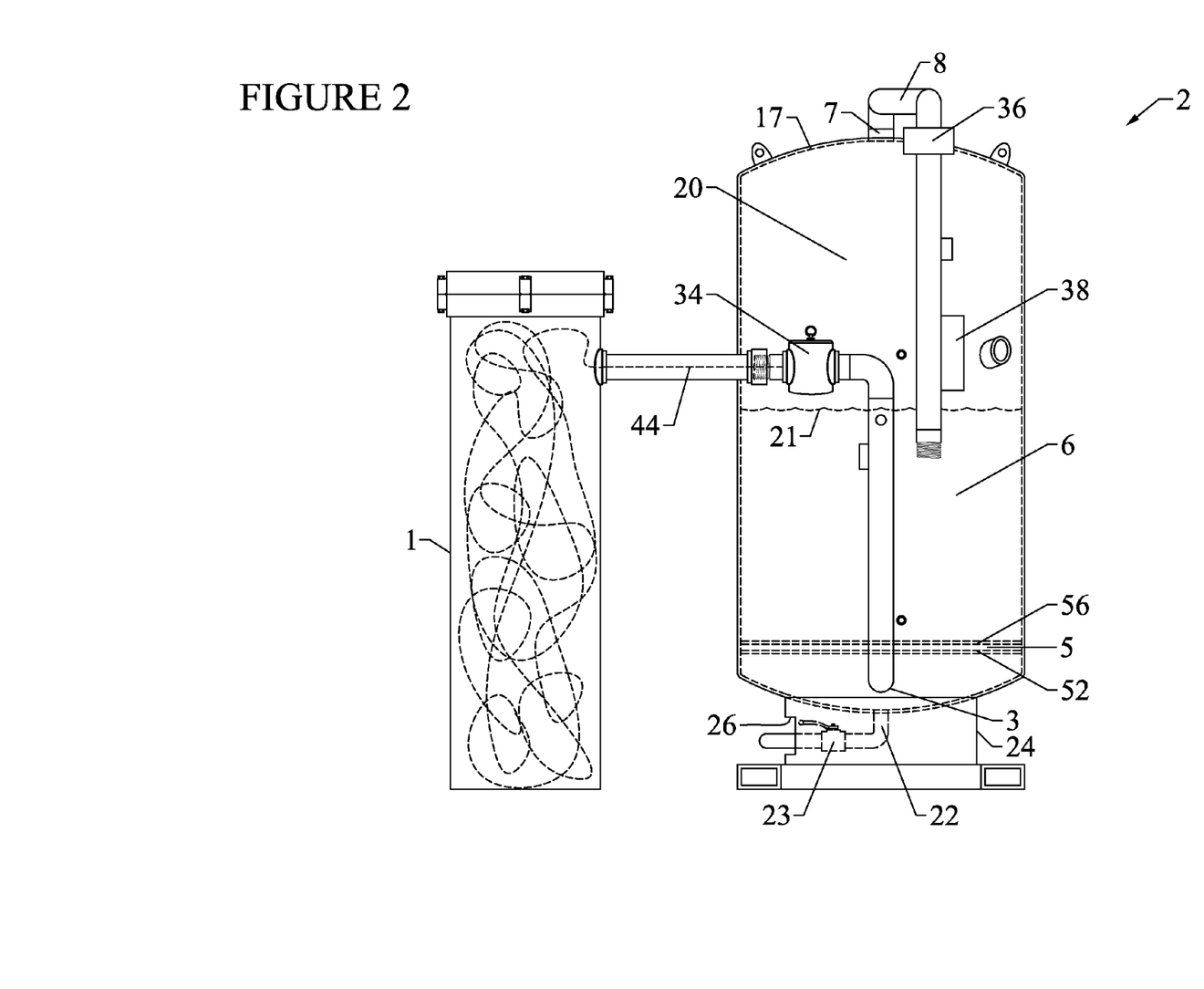
FIG. 2 is an alternative view of the overall system.

FIG. 2 depicts an alternate embodiment of the scrubber 2 connected to a source 1 of fluid to be scrubbed 44.

In FIG. 2, an inlet check valve 34 is shown positioned between a source 1 of fluid to be scrubbed 44 and the inlet 3 of the scrubber 2. The inlet check valve 34 can be used to control the flow of fluid to be scrubbed 44 through the inlet 3. The inlet check valve 34 can be a low pressure valve, such as between about 1 psi to about 100 psi. The inlet check valve 34 can also be a swinging check valve. A feature of the embodiments is that the inlet pressure can be low, making this scrubber safer than high pressure scrubbers.

Figure 3:
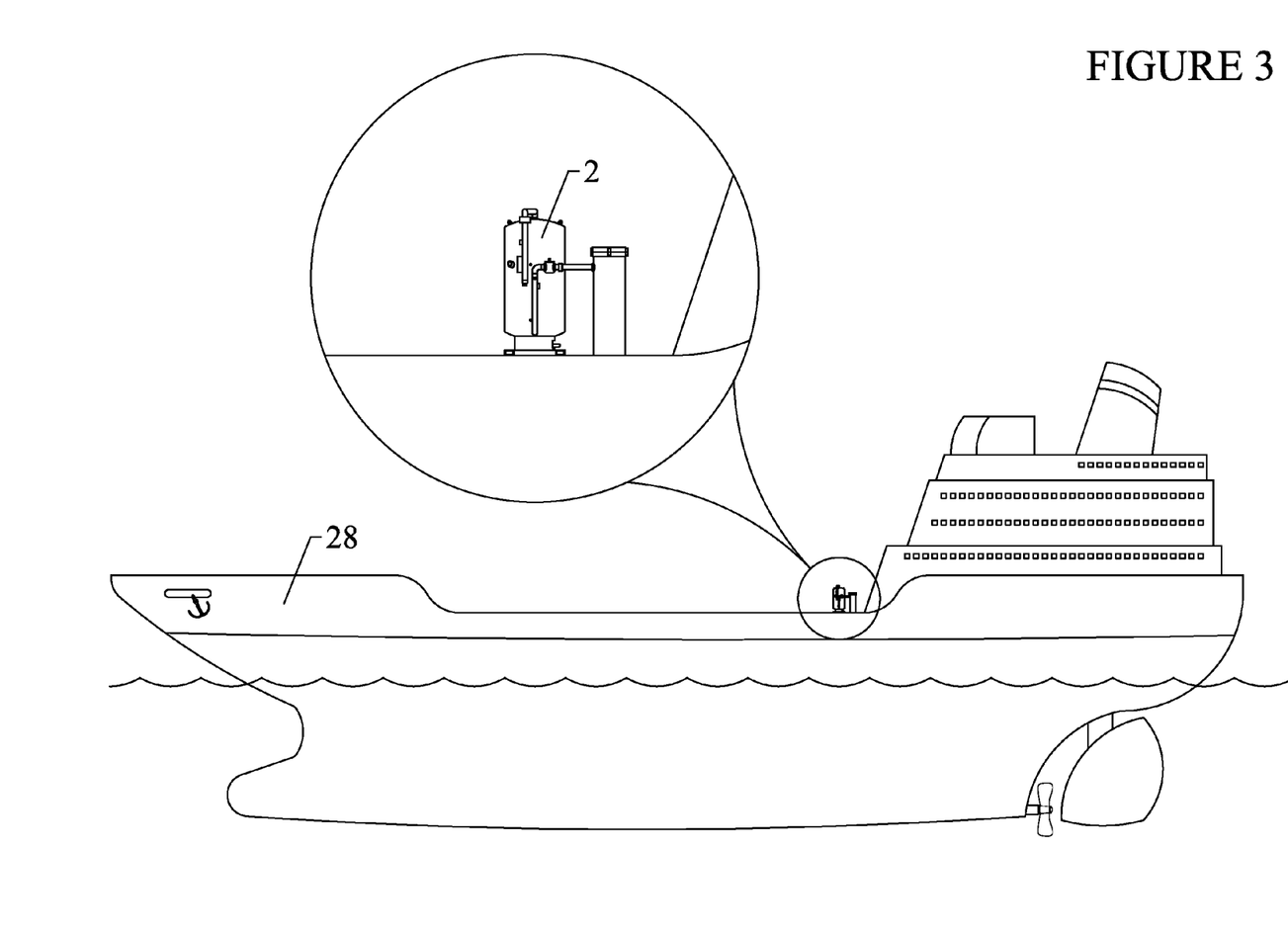
FIG. 3 is an embodiment of the invention on a ship.

FIG. 3 shows an embodiment of the scrubber 2 on a movable transport vehicle 28 that in this version is a barge.

Figure 4:
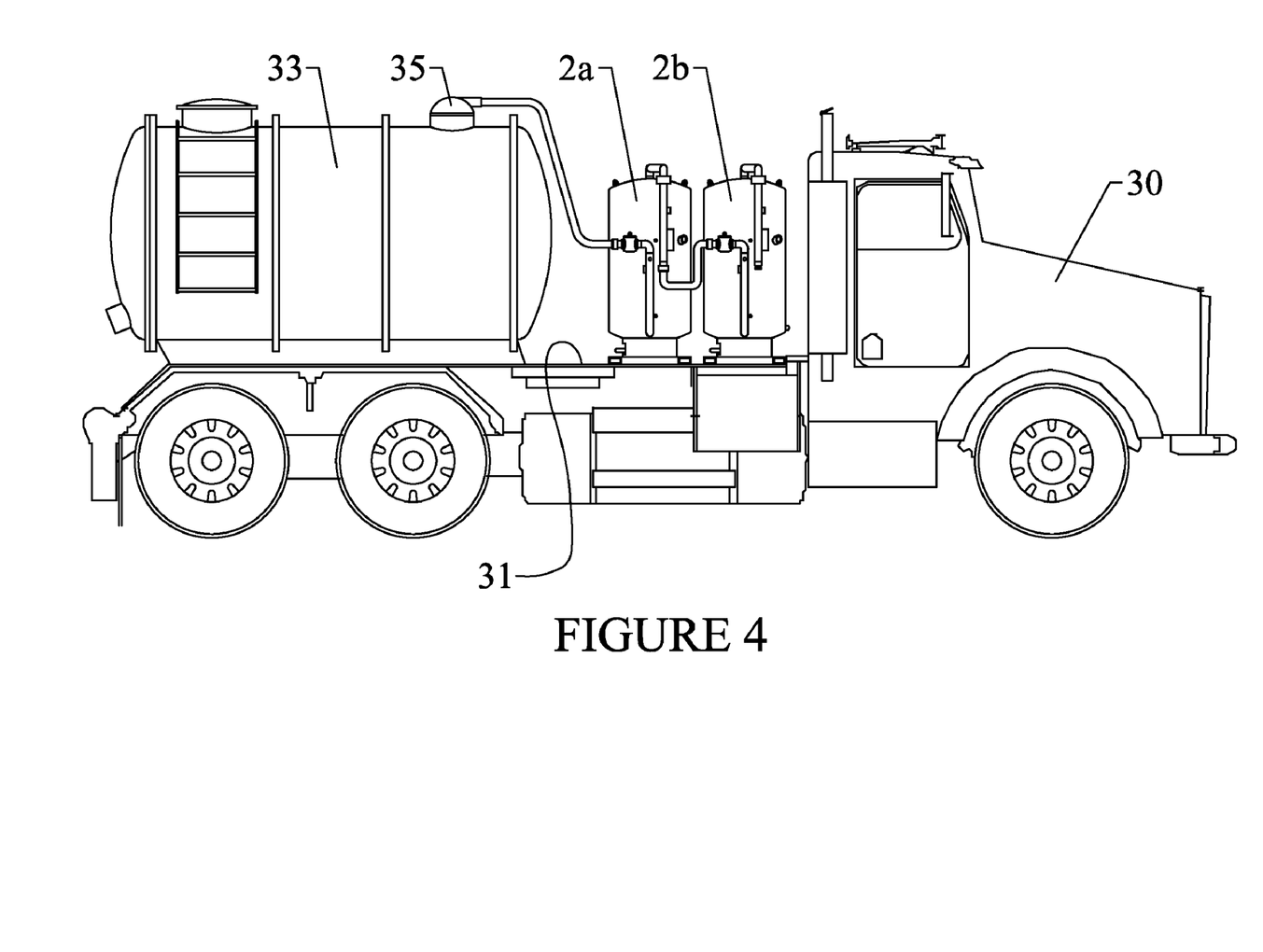
FIG. 4 is an embodiment of the invention on a vacuum truck.

FIG. 4 shows an embodiment of a plurality of scrubbers 2a, 2b connected in series on a transport vehicle, which is depicted as truck 30 in this embodiment. This embodiment shows that a first scrubber 2a can connect to a second scrubber 2b and additional scrubbers can further be added to provide versatility in capacity of scrubbing fluids, such as during a start up from a turn around at a chemical plant, when excess capability might be needed for a short time; but not for a long term solution. The modularity of the scrubbers, the ability to mix and match scrubber sizes to a need of a user, provides a unique advantage to this invention. Additionally, if a fluid stream needs to be "multiprocessed," that is treated to the same biodiesel or biomass repeatedly, the scrubbers connected in series enable this operation style.

FIG. 4 further shows a truck 30 with a bed 31, a vacuum pump 33 with a vacuum pump exhaust 35. The scrubbers 2a, 2b can be connected to the vacuum pump exhaust 35.

In the embodiment of FIG. 4 the scrubbers 2a, 2b can be removably connected to the bed 31 of the truck 30, creating a modular transportable system using modular scrubbers. Another embodiment can contemplate welding the scrubbers to the bed of the truck, creating an immovable scrubber on the bed, while the truck is moveable.

Figure 5:
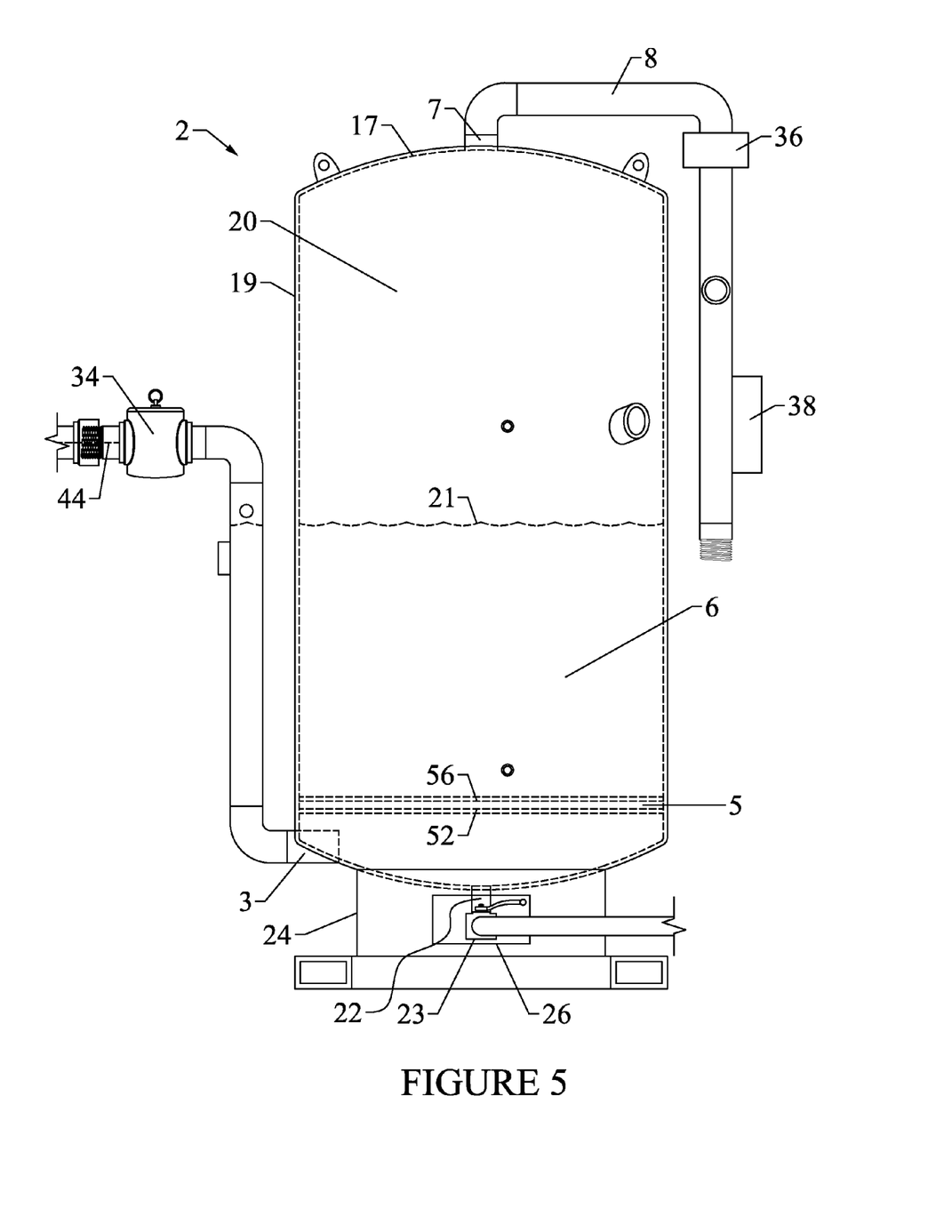
FIG. 5 depicts the system prior to the introduction of fluid to be scrubbed to the scrubber.

FIG. 5 shows scrubber 2 with biodiesel or biomass 6 prior to introducing the fluid to be scrubbed 44 through the inlet 3. Biodiesel or biomass 6 is shown filling the reaction chamber 20 on both the first side 52 and second side 56 of the sintered permeable membrane 5.

FIG. 6 depicts the scrubber 2 with biodiesel or biomass 6 having moved through the sintered permeable membrane 5. The fluid to be scrubbed 44 is shown flowing from the inlet 3 into the reaction chamber 20. The fluid to be scrubbed 44 can then pass through the sintered permeable membrane 5 forming the reaction zone 46.

The fluid to be scrubbed 44 can have a contamination concentration greater than 0 ppb to saturation, such as in the range of about 20 ppm to about 250 ppm.

The fluid to be scrubbed can be fluid with contaminates that are volatile organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the fluid to be scrubbed.

For example, in Corpus Christi, Tex., a gas to be scrubbed can be a stream of gas with more than about 5 ppm benzene as of Jan. 29, 2009.

The fluid to be scrubbed can be anticipated to be gases that exceed federal Environmental Protection Agency "EPA" Title 40 regulations as of Jan. 1, 2009 and Texas Commission on Environmental Quality Title 30 regulations regulatory levels as of Jan. 1, 2009.

The sintered permeable membrane 5 can provide a reaction zone 46 wherein the fluid to be scrubbed 44 can be introduced from the inlet 3 to a first side 52 of the sintered permeable membrane. At the start of the process, the sintered permeable membrane 5 can be immersed in the biodiesel or biomass 6 and all the pores can then be filled with the biodiesel or biomass.

Initially the biodiesel or biomass can act as a valve, to control the exit of cleaned fluid, enabling pressure to build up in the housing without the need for an additional exit valve, which enables the scrubber to uniquely behave more reliably.

As the fluid to be scrubbed increases, the pressure beneath the sintered permeable membrane 5, the biodiesel or biomass 6 can begin to move through the pores with the fluid, scrubbing the fluid due to the tremendously increased surface area of the pores.

As scrubbing occurs, a "head pressure" can be created and the biodiesel or biomass 6 can move into the reaction zone 46 above the sintered permeable membrane 5, the fluid to be scrubbed 44 can then be introduced below the sintered permeable membrane 5, in the reaction chamber 20. The fluid to be scrubbed can then move through the sintered permeable membrane 5 into the reaction zone 46.

Cleaned fluid, which is identified herein as scrubbed fluid 12, can flow past a second side 56 of the sintered permeable membrane. The scrubbed fluid 12 has a drop in contamination concentration of at least about 99 percent and gradually decreases to about 70 percent as additional fluid to be scrubbed is introduced to the housing through the inlet without refilling or replacing the biodiesel or biomass.

The system uses a non-foaming or low foaming turbulent flow process that can recover up to about 90 percent to about 99 percent of volatile organic contaminates when using biodiesel. Laminar flow systems, such as slotted pipe or perforated plate, can be utilized but will not yield the same efficiency.

In an embodiment, it can be contemplated that the contamination concentration can be between about 562,000 ppm and about 100 ppm for the fluid to be scrubbed.

The scrubbed fluid 12 can exit the reaction chamber 20 through the exit port 7 into the exit conduit 8.

The knock out canister 36 can serve to knock out, remove, or capture any of the liquid that can be entrained in the scrubbed fluid 12. The knock out canister can be located between a vent 38, as shown in FIG. 1, and the exit conduit 8.

Figure 7:
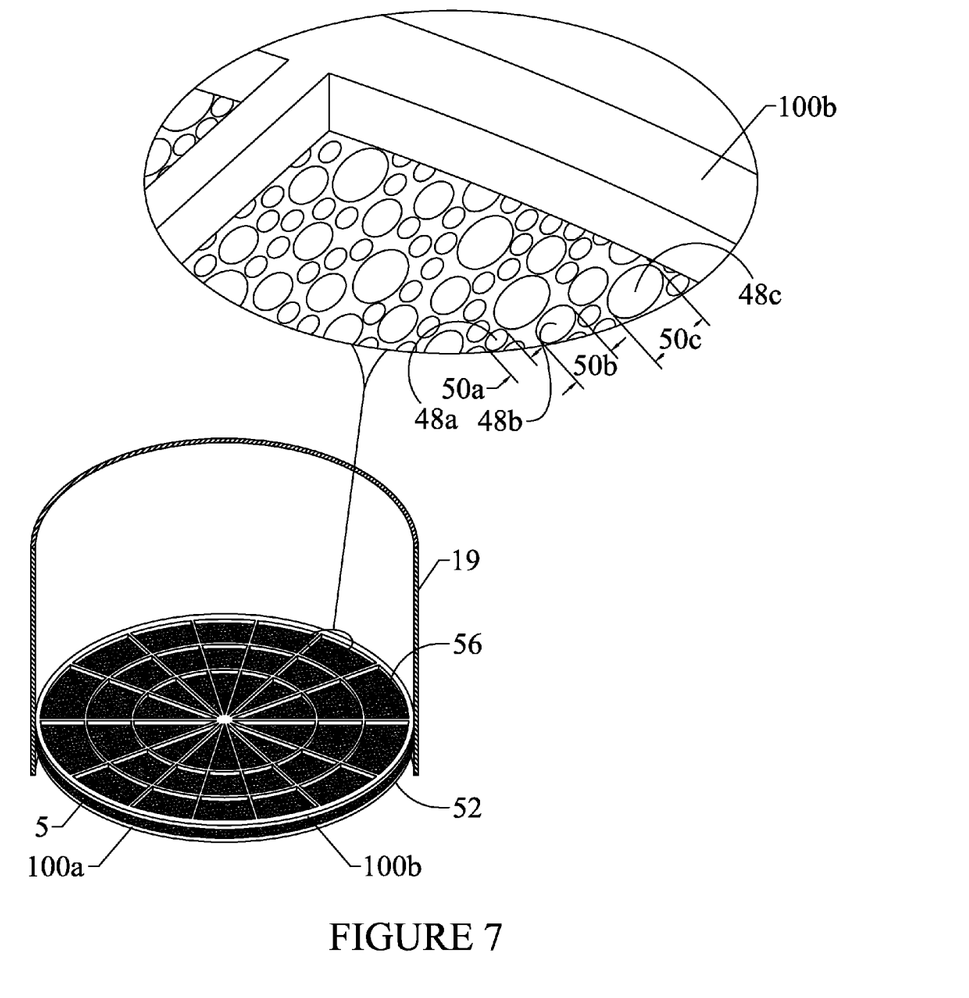
FIG. 7 is a cut view of the housing showing the sintered permeable membrane.

FIG. 7, depicts a partial cut view of the housing 19, without an interior liner, revealing the sintered permeable membrane 5.

The sintered permeable membrane 5 can have pores of identical diameters, such as all being about 50 micron diameters. The pores 48a, 48b, 48c can have pore diameters 50a, 50b, 50c. However, the pores can range in diameter from about 1 micron to about 10,000 microns.

The sintered material of the sintered permeable membrane can have void spaces equivalent to between about 40 percent to about 50 percent of the sintered permeable membrane that is the material making up the membrane can have open spaces that are between about 40 percent to about 50 percent. The sintered material of the sintered permeable membrane can have both internal pores and external pores.

In an embodiment, the void spaces can be greater then 50 percent or less then 40 percent depending upon the sintered material used. For example, if the sintered material used is carbon aerogel, it can have a void fraction of about >680 percent.

The sintered permeable membrane can be between about 1/32 inch thick to about 24 inches thick FIG. 7 further shows that the sintered permeable membrane 5 can be held in place inside the reaction chamber using pad grids 100a, 100b.

The sintered permeable membrane can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

Figure 8:
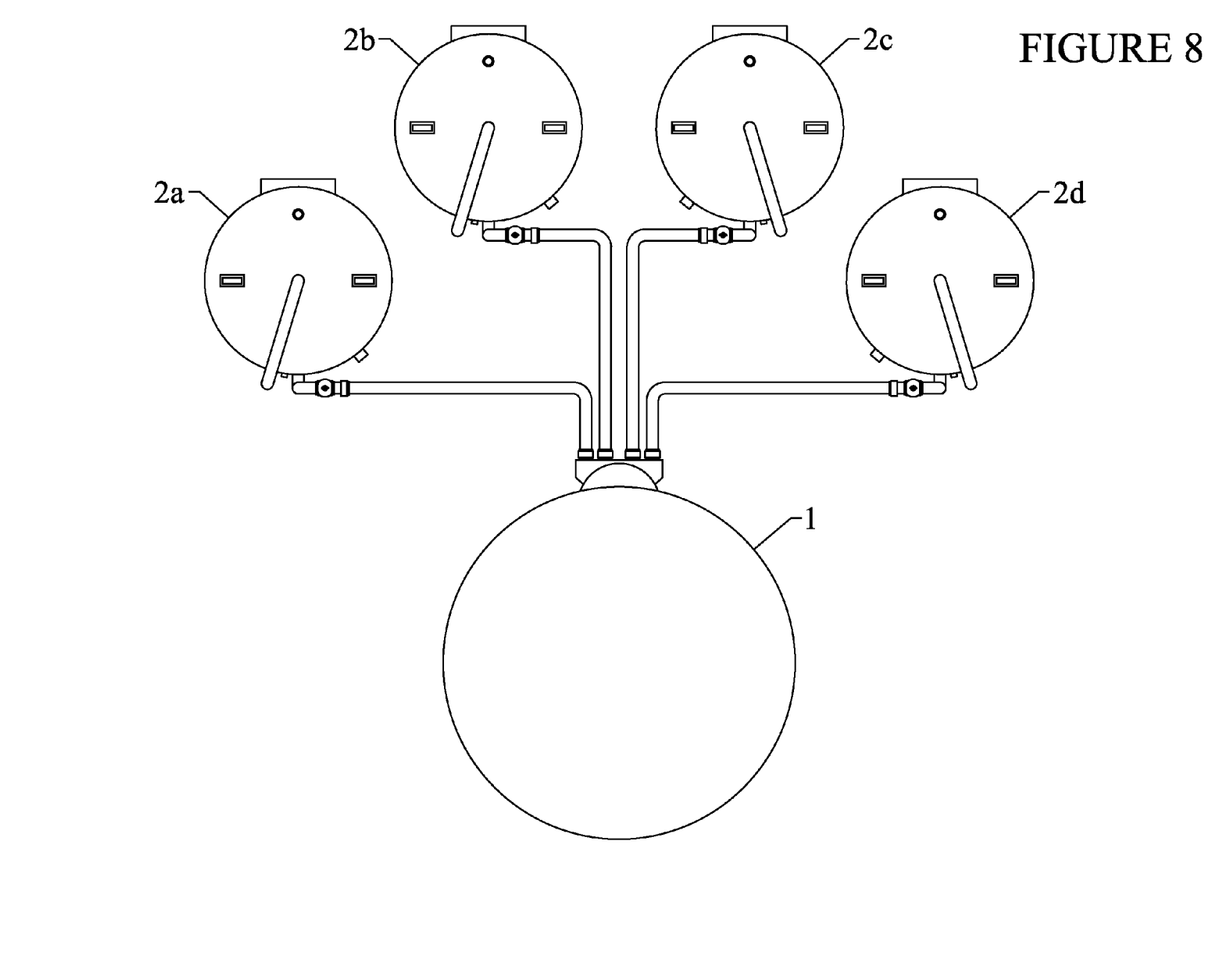
FIG. 8 shows four scrubbers connected in parallel according to an embodiment of the invention.

FIG. 8 shows that a plurality of scrubbers 2a, 2b, 2c, 2d can be connected in parallel to a source 1 so that several streams can be treated simultaneously on a vehicle. That is, a large fluid stream can be split into two streams that go to two scrubbers in parallel on a truck or trailer. Between about 2 scrubbers to about 12 scrubbers can be used in this embodiment. Additional scrubbers can be used for this purpose, which can be particularly advantageous in the event of a natural disaster, such as a hurricane, when a plant has gone down due to damage, and needs to be brought back up; but for safety considerations, the streams preventively are run through the scrubbers to ensure there are no additional problems, as sensors may have been damaged by the hurricane and accurate detection might be difficult.

While these embodiments have been described with emphasis on the embodiments, it should be understood that within the scope of the appended claims, the embodiments might be practiced other than as specifically described herein.

What is claimed is:

1. A system for removing unwanted contaminates from fluid, wherein the system comprises:

a. a source containing fluid to be scrubbed, wherein the fluid to be scrubbed has a contamination concentration greater than zero ppb to contamination saturation; and b. a scrubber comprising:

(i) a housing with a reaction chamber, wherein a portion of the reaction chamber contains a biodiesel or biomass, and wherein a reaction zone is formed below a liquid level of the biodiesel or biomass;

(ii) an inlet in the housing connected to the source, and wherein the inlet is disposed below the liquid level of the biodiesel or biomass; and (iii) an exit port connected to the housing adapted for evacuating scrubbed fluid; a sintered permeable membrane disposed in the reaction zone, wherein the sintered permeable membrane is configured to contact the fluid to be scrubbed that have been in prior contact with the biodiesel or biomass in a portion of the reaction chamber, and wherein the sintered permeable membrane provides an interface for enhanced contact of the fluid to be scrubbed and the biodiesel or biomass, and wherein the sintered permeable membrane is sandwiched between two pad grids, wherein the two pad grids secure the sintered permeable membrane in the housing, and wherein the sintered permeable membrane comprises open spaces that are from 40 percent to 50 percent, and wherein the sintered permeable comprises a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

2. The system of claim 1, wherein the sintered permeable membrane comprises pores with different pore sizes.

3. The system of claim 1, wherein the housing further comprises a drain port disposed through the housing communicating with the reaction zone.

4. The system of claim 3, further comprising a drain valve for controlling flow from the drain port disposed between the housing and a collection tank.

5. The system of claim 1, wherein the contaminates comprise volatile organic compounds, hazardous air pollutants, hydrogen sulfides, ammonia, sulfur dioxide and combinations thereof.

6. The system of claim 1, wherein the housing further comprises a liner within the housing surrounding the reaction zone.

7. The system of claim 1, further comprising an exit conduit connected to the exit port.

8. The system of claim 7, further comprising a knock out canister disposed between the exit conduit and a vent.

9. The system of claim 1, further comprising a pedestal for supporting the scrubber, wherein the pedestal comprises a pedestal access port connecting to a drain port located on the housing.

10. The system of claim 1, further comprising a manway disposed in the housing for providing access to the reaction chamber.

11. The system of claim 1, further comprising an inlet check valve to control a flow of the fluid to be scrubbed through the inlet.

* * * * *